United States Patent [19]
Umeda et al.

[11] Patent Number: 5,780,953
[45] Date of Patent: Jul. 14, 1998

[54] ALTERNATOR

[75] Inventors: Atsushi Umeda, Anjo; Norihito Tokura, Okazaki; Hirohide Sato, Toyokawa; Makoto Taniguchi; Shin Kusase, both of Obu, all of Japan

[73] Assignee: Nippondenso Co., Ltd., Kariya, Japan

[21] Appl. No.: 658,532

[22] Filed: Jun. 5, 1996

Related U.S. Application Data

[63] Continuation-in-part of Ser. No. 351,027, Dec. 7, 1994, Pat. No. 5,608,616.

[30] Foreign Application Priority Data

| Dec. 7, 1993 | [JP] | Japan | 5-306782 |
| Dec. 13, 1993 | [JP] | Japan | 5-312161 |
| Jun. 6, 1995 | [JP] | Japan | 7-139519 |

[51] Int. Cl.$^6$ ........................ H02K 1/22
[52] U.S. Cl. ........................ 310/263; 310/68 D
[58] Field of Search ........................ 310/263, 179, 310/154, 156, 68 R, 68 D; 322/28, 29

[56] References Cited

U.S. PATENT DOCUMENTS

| 4,959,577 | 9/1990 | Radomski | 310/263 |
| 4,985,743 | 1/1991 | Tokura et al. | 359/39 |
| 5,132,581 | 7/1992 | Kusase | 310/263 |
| 5,177,391 | 1/1993 | Kusase | 310/263 |
| 5,204,570 | 4/1993 | Gerfast | 310/156 |
| 5,233,215 | 8/1993 | Baliga | 257/490 |
| 5,306,977 | 4/1994 | Hayashi | 310/263 |
| 5,483,116 | 1/1996 | Kusase et al. | 310/263 |
| 5,502,368 | 3/1996 | Syverson et al. | 322/28 |
| 5,550,457 | 8/1996 | Kusase et al. | 322/29 |

FOREIGN PATENT DOCUMENTS

| 0657947 | 6/1995 | European Pat. Off. . |
| 0657992 | 6/1995 | European Pat. Off. . |
| 657992 | 6/1995 | European Pat. Off. . |
| 38 24 836 | 2/1989 | Germany . |
| 61-80858 | 4/1986 | Japan . |
| 61-85045 | 4/1986 | Japan . |
| 63-202255 | 8/1988 | Japan . |
| 4-138030 | 5/1992 | Japan . |
| 2281665 | 3/1995 | United Kingdom . |

OTHER PUBLICATIONS

2244 Research Disclosure (1992) Aug., No 340 Emsworth, GB "Alternating Current Generator".

J.W.Palmour et al, "6H–Silicon Carbide Power Devices for Aerospace Applications", American Chemical Society, Aug. 8, 1993.

*Primary Examiner*—Thomas M. Dougherty
*Assistant Examiner*—Michael J. Wallace, Jr.
*Attorney, Agent, or Firm*—Cushman Darby & Cushman IP Group of Pillsbury Madison & Sutro LLP

[57] ABSTRACT

In an on-vehicle alternator, both the magnetic flux variation frequency and maximum flux density are decreased sufficiently to thereby decrease the internal iron loss and thereby realize an increase in the current generation efficiency. The on-vehicle alternator comprises a rotor wherein magnetic pole cores that are polarized by a rotor coil to alternately different polarities are circumferentially disposed on the outer periphery thereof at prescribed equi-angular intervals. A permanent magnet which is embedded within a resin-made retainer body is provided between the magnetic pole cores and has side faces, as viewed circumferentially, which are polarized respectively to the same polarities as those of adjacent respective magnetic pole cores to thereby vary the magnetic flux quantity directed toward stator coils so as to exhibit a circumferential gentle curve. A rectifier is constructed using SiC-MOS transistors so that it is conductive and operative to thereby charge a battery with the current developed in the stator coils only when the alternating current voltages generated in the stator coils have become higher than the battery voltage.

17 Claims, 7 Drawing Sheets

ALTERNATOR

CROSS REFERENCE TO RELATED APPLICATION

This application is a continuation-in-part of U.S. application Ser. No. 08/351,027, now U.S. Pat. No. 5,608,616 and claims priority from Japanese Patent Application No. 7-139519, incorporated herein by reference. It is related to those applications and Japanese Patent Application Nos. 5-306782 and 5-312161, also incorporated herein by reference.

BACKGROUND OF THE INVENTION

1. Field of the Invention

The present invention relates to an alternating current generator (alternator) and more particularly to an on-vehicle alternator that has a decreased internal iron loss and an improved current generation efficiency. The applied range thereof extends from an ordinary engine-driven alternator to an alternator enabling generated power driving that regenerates power used at a vehicle-brake time or an alternator that causes power regeneration with respect to a vehicle travel motor.

2. Related Arts

With a recent demand for decreasing the fuel consumption of vehicles, there has been an increasing demand for the enhancement of the current generation efficiency. In order to realize enhancement thereof, it is necessary to decrease the loss that is produced during current generation, and therefore, to decrease the iron loss that occupies a large proportion of this loss.

As well known, in the case of a synchronous generator, the iron loss WF is produced mainly within the stator core, and as is expressed by the equation (1), the iron loss WF becomes a function of the frequency f of variations in the magnetic flux crossing the stator core and the maximum magnetic flux density Bm thereof.

$$WF = \sigma h \cdot f \cdot Bm^2 + \sigma e \cdot f^2 \cdot Bm^2 \qquad (1)$$

The first member of this equation represents the hysteresis loss, the second member thereof represents the eddy current loss and σh and σe represent constants that are determined depending upon the base material employed, respectively.

Accordingly, in order to decrease the iron loss WF, it is necessary to decrease the above frequency f and maximum magnetic flux density Bm to the greatest possible extent.

Assuming that the rotation-angular velocity of the rotor is represented by ω, as is expressed by the equation (2), the magnetic flux quantity Φ(t) traversing the stator core contains higher harmonic components that are twice or three times as high as the fundamental frequency.

$$\Phi(t)=\Phi_0\{sin\ \Phi t+k_1 sin\ (2\Phi t+\sigma_1)+k_2 sin\ (3\omega t+\sigma_2)\ldots\} \qquad (2)$$

The reason why higher harmonic components appear in the variation in the magnetic flux quantity Φ(t) is due to the magnetic field formed by the magnetic pole core of the rotor not exhibiting a sinewave-like gentle variation but exhibiting a distortion. The frequency f becomes substantially high due to these higher harmonic components, with the result that the iron loss becomes large.

Conventionally, in order to smooth this variation in magnetic flux, measures are taken to chamfer the surface of the magnetic core or enlarging the skew the magnetic pole large. While, on the other hand, in order to make the maximum magnetic flux density low, measures are taken to enlarge the sectional area of the stator core.

However, measures taken to chamfer the magnetic core conversely decrease the generated current output due to a decrease in the surface area of the magnetic core, with the result that chamfering was limited in light of the trade-off.

Also, measures taken to enlarge the sectional area of the stator core resulted in a decrease in the winding space of the stator coil, and hence, resulted in a decrease in the generated current output due to the resulting increase in the output impedance of the alternator. Thus, a limitation was imposed on this enlargement in light of the trade-off.

SUMMARY OF THE INVENTION

In view of the above-mentioned problem, an object of the present invention is to provide an alternator wherein both the magnetic flux variation frequency and the maximum magnetic flux density are sufficiently decreased with no limitation resulting in terms of the above trade-off to thereby make the internal iron loss small and thereby enhance the current generation efficiency.

In order to attain the above object, according to the present invention, there is provided an alternator which includes a rotor wherein Lundell type magnetic poles that are polarized by a rotor coil to alternately different polarities are circumferentially disposed on an outer periphery thereof. A permanent magnet is disposed between the Lundell type magnetic poles and whose side faces, as viewed circumferentially, are polarized respectively to the same polarities as those of adjacent respective Lundell type magnetic poles to thereby cause the magnetic flux directed toward a stator coil to exhibit a gentle variation in polarity. A rectifying switching means constructed using a MOS type transistor converts an alternating current voltage generated in the stator coil to a direct current voltage to thereby charge a battery by the current of the stator coil.

BRIEF DESCRIPTION OF THE DRAWINGS

These and other objects, features and characteristics of the present invention will be appreciated from a study of the following detailed description, the appended claims, and drawings, all of which form a part of this application. In the drawings:

DETAILED DESCRIPTION OF THE PRESENTLY PREFERRED EXEMPLARY EMBODIMENTS

Figure 1:
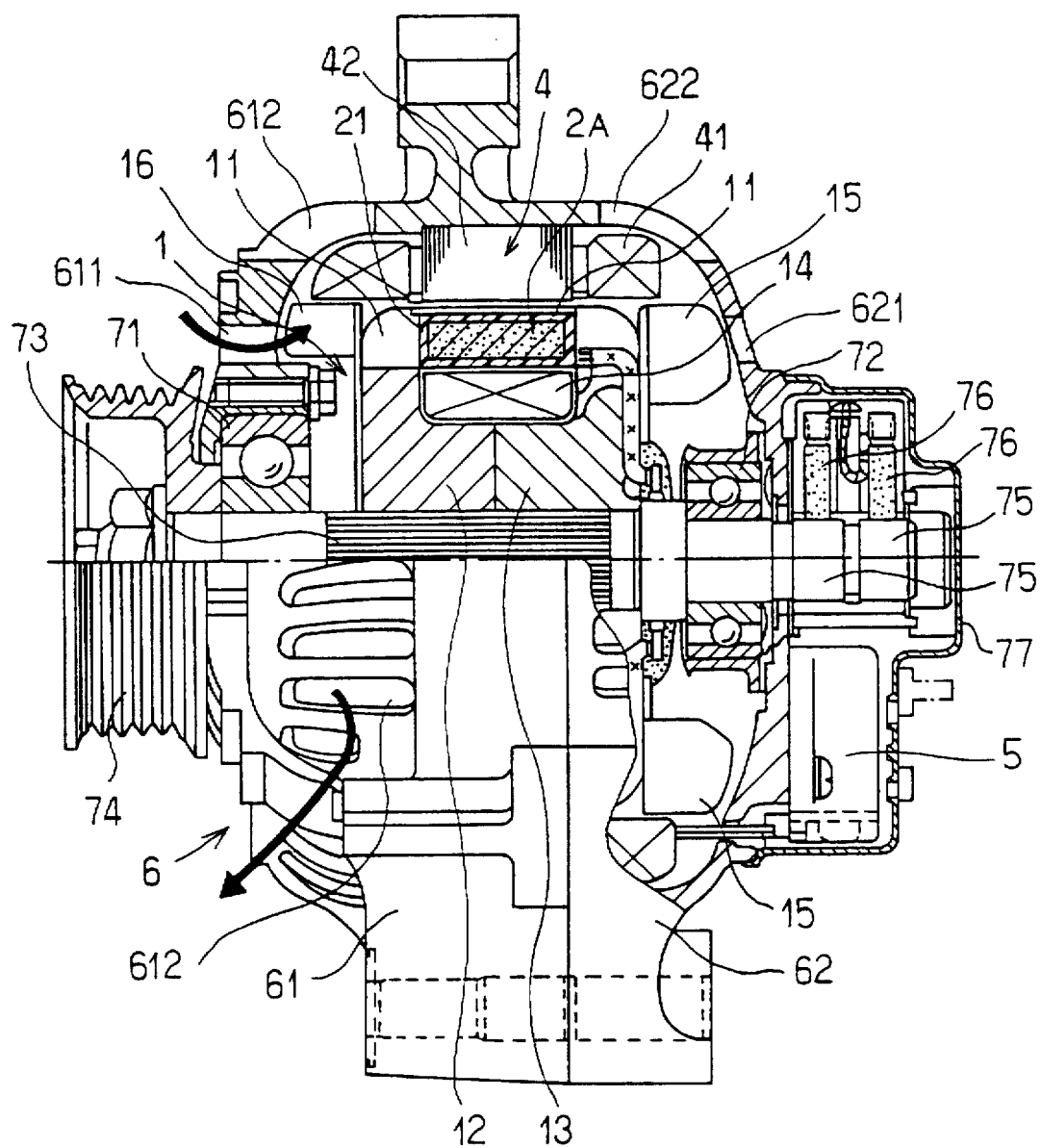
FIG. 1 is a semi-sectional side view of an alternator according to an embodiment of the present invention, the section of the rotor portion being taken along the line I—I of FIG. 2.

As described above, in order to decrease both the magnetic flux variation frequency and the maximum magnetic flux density sufficiently with no limitation in terms of the above trade-off, an alternator according to the present invention includes a rotor wherein Lundell type magnetic poles that are polarized by a rotor coil to alternately different polarities are circumferentially disposed on an outer periphery thereof at prescribed equi-angular intervals. A permanent magnet which is disposed between the Lundell type magnetic poles and whose side faces, as viewed circumferentially are polarized respectively to the same polarities as those of adjacent respective Lundell type magnetic poles to thereby cause the magnetic flux directed toward a stator coil to exhibit a circumferential gentle variation in polarity. A rectifying switching means constructed using a MOS type transistor converts an alternating current voltage generated in the stator coil to a direct current voltage to thereby charge a battery by the current of the stator coil.

According to this construction, since the polarity of the magnetic flux, which is directed toward the stator coils, is smoothly varied in the circumferential direction due to the permanent magnet provided between the Lundell type magnetic poles, the higher harmonic components in the variations in the magnetic flux are removed, with the result that the iron loss in the stator core is decreased.

Also, since the rectifying switching means is constructed using the MOS type transistor whose on-resistance is small, it is possible to decrease the generated current voltage by the extent to which the voltage drop is decreased by the rectifying switching means (called also "rectifier"), whereby the maximum magnetic flux density in proporation thereto is decreased. As a result, the iron loss in the stator core is decreased.

Further, since the generation of heat from the rectifying switching means is decreased, it is possible to decreasing the size of the entire rectifying means through the miniaturization of the radiation fin, etc.

Also, the alternator according to the present invention can be made into a polyphase alternating current alternator. In the case of a three-phase alternating current alternator, for example, the above-mentioned construction is performed as follows: the stator coil is provided for each of three phases. Three pairs of the MOS type transistors, each pair being constructed of a series-connected MOS type transistor, are connected in parallel with each other between terminals of the battery. The stator of each phase is connected between points of connection of the paired MOS type transistors. According to this construction, it is possible to decrease, in the three-phase alternating current alternator, the loss of the current generated therefrom.

It is suitable to form the MOS type transistor from monocrystalline SiC material. The MOS type transistor made using the SiC material can have decreased on-resistance as compared to the one made using ordinary Si material even after the required breakdown voltage is ensured. As a result, the generated current voltage and the maximum magnetic flux density are further decreased with the result that the iron loss in the stator core can be made sufficiently small.

Also, in the above-mentioned alternator, the permanent magnet is preferably accommodated within a resin-made retainer body having a heat insulation property, and is provided between the Lundell type magnetic poles. According to this construction, since the heat generated in the Lundell type magnetic pole does not transfer to the permanent magnet provided within the retainer body, it is possible to prevent high temperature demagnetization due to a rise in the temperature of the permanent magnet. This results in the variation of magnetic flux being smoothly maintained at even an elevated temperature.

Meanwhile, the retainer body preferably is constructed in the form of a ring that is periodically folded back in such a manner as to extend between the Lundell type magnetic poles that alternately project from a front and a rear side face of the rotor onto an outer peripheral surface thereof. Thus the permanent magnet is accommodated in each folded back leg portion of the retainer body. According to this construction, a plurality of the permanent magnets can be integrally accommodated in the retainer body, with the result the assembly of the permanent magnets and storage thereof are easy. Also, since the Lundell type magnetic poles are each surrounded at their three aspects by the retainer body having the heat insulation property, excessive dissipation of heat therefrom is prevented. Therefore, the electrical resistance of the surface thereof increases due to moderate elevation in the temperature thereof, with the result that the generation an eddy current is prevented. As a result, the iron loss in the Lundell type magnetic poles also becomes small.

Further, flanges preferably are provided with respect to the Lundell type magnetic poles in such a manner as to project at least circumferentially from both side edges thereof. These flanges preferably are made to abut on an outer peripheral surface of the retainer body. Due to the existence of these flanges, the variations in magnetic flux at the boundaries between the Lundell type magnetic poles and the permanent magnet become further smoothed. Also, due to the flanges, the retainer body can be reliably positioned.

In the above-mentioned various constructions, an anisotropic ferrite magnet or a resin magnet containing rare earth magnet powder can be applied used as the permanent magnet. That is, by using an anisotropic magnet made of ferrite that is substantially an electrical insulator, or by using a resin magnet containing rare earth magnet powder, as the permanent magnet, no eddy current is caused to be generated in the permanent magnet with the result that, decrease in the loss is furthered.

An embodiment of the present invention as illustrated in the drawings will now be explained.

First, the structure and operation for decreasing the frequency of variations in the magnetic flux will be explained.

FIG. 1 is a vertical sectional view illustrating an entire structure of an on-vehicle alternator. A frame 6 of the alternator is constructed in such a manner that a drive frame 61 and a rear frame 62 abut on each other. At a center of the frame 6, a shaft 73 is provided in such a manner as to be supported by bearings 71 and 72. The shaft 73 is rotated by an engine power inputted to the alternator via a pulley 74 mounted on a front end (the left end of the illustration) thereof.

A Lundell type rotor core that is constructed of a front core 12 and a rear core 13 made to abut thereon is fixed onto the shaft 73. A rotor coil 14 is wound around the Lundell type rotor core. An anisotropic permanent magnet 2A made of ferrite material, that is embedded in a retainer body 21 made of resinous material such as PPS (polyphenylene sulfide) is disposed in proximity to an outer periphery of the rotor coil 14.

Figure 2:
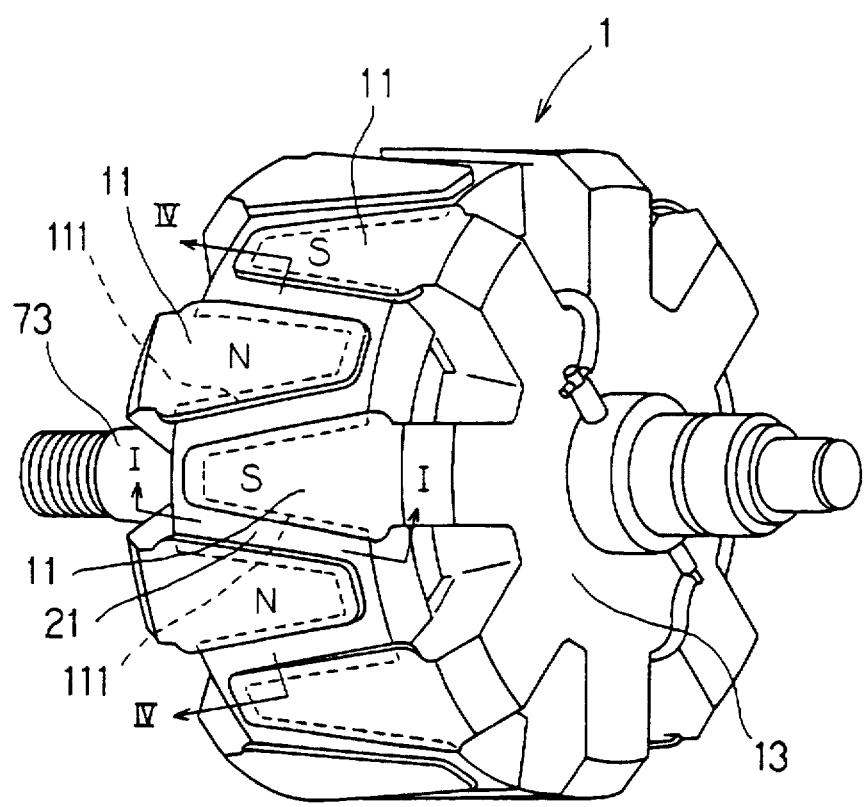
FIG. 2 is a perspective view of an entire rotor in the embodiment of the present invention.

The outer appearance of a rotor 1 is illustrated in FIG. 2. From the front core 12 and rear core 13 there are extended alternately Lundell type claw shaped magnetic poles 11 from front and rear side faces thereof to the outer peripheral surface in such a manner that the magnetic poles 11 are bent and projected. The claw shaped magnetic poles 11 are energized to alternately different polarities N and S by supply of current to the rotor coil 14 (FIG. 1). Also, the retainer body 21 is provided in such a manner as to extend into gaps between the Lundell type claw magnetic poles 11.

Figure 3:
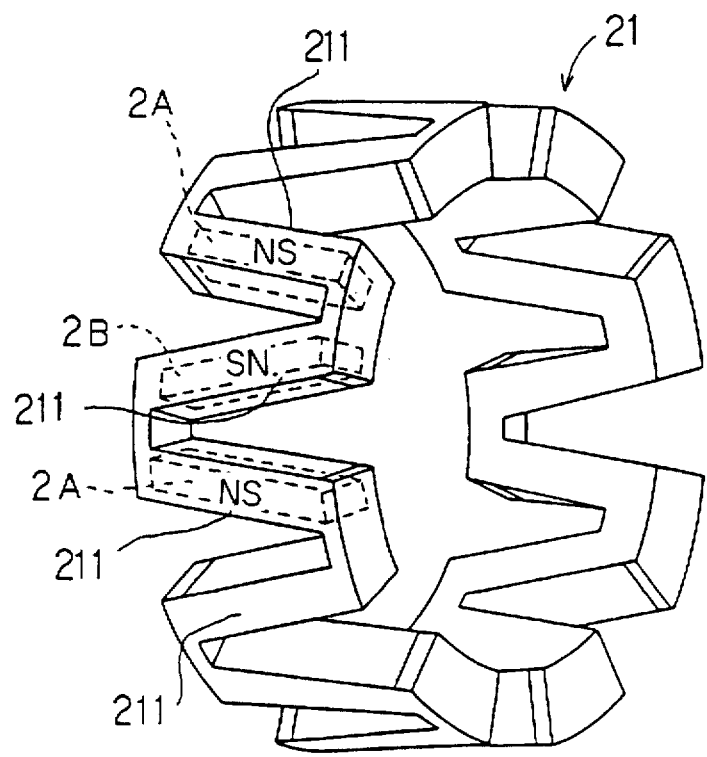
FIG. 3 is a perspective view of an entire retainer body in the embodiment of the present invention.
Figure 4:
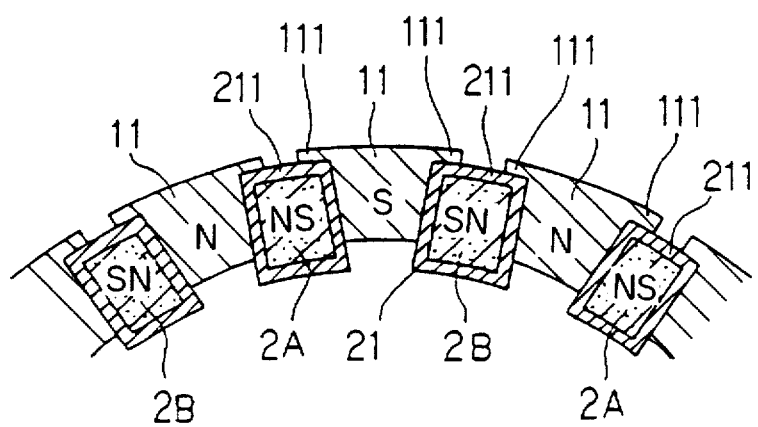
FIG. 4 is a sectional view of an outer periphery of the rotor in the embodiment of the present invention, the section being taken along the line IV—IV of FIG. 2.

The retainer body 21 as a whole is in the form of a ring as illustrated in FIG. 3 and is folded back at prescribed space intervals into inverted V shapes and extends circumferentially in such a manner so as to follow the gaps between the Lundell type claw magnetic poles 11 (FIG. 2). Permanent magnets 2A and 2B are located within folded back leg portions 211 (in FIG. 3 only three permanent magnets are illustrated). As illustrated in FIG. 4, the permanent magnets 2A and 2B are polarized so that both side faces thereof, as viewed circumferentially, may have the same polarities as those of adjacent Lundell type claw shaped magnetic poles 11. The intensity of the magnetic force thereof is the same extent as the corresponding intensity of the magnetic force developed in the Lundell type claw shaped magnetic poles 11 that are adjacent thereto via side walls of the retainer body 21.

As illustrated in FIG. 4, flanges 111, each of a prescribed width, project circumferentially as side edges of an outer peripheral end (the upper end of the illustration) of each claw shaped magnetic pole 11 so that at least part thereof may overlap upon the permanent magnets disposed in the retainer body 21 in the radial direction. Thus, both side edges of each leg portion 211 of the retainer body 21 are positioned by these flanges 111.

In FIG. 1, a ring shaped stator 4 is provided in proximity to an outer periphery of the rotor 1 and slots are formed in a stator core 42 circumferentially in equi-angular distant manner. Stator coils 41 are wound in a known structure with respect to these slots. When the rotor 1 is rotated, the magnetic fluxes developed in the magnetic pole cores 11 and permanent magnets 2A and 2B cross the stator coils 41, whereby alternating current voltages are developed therein.

Figure 5:
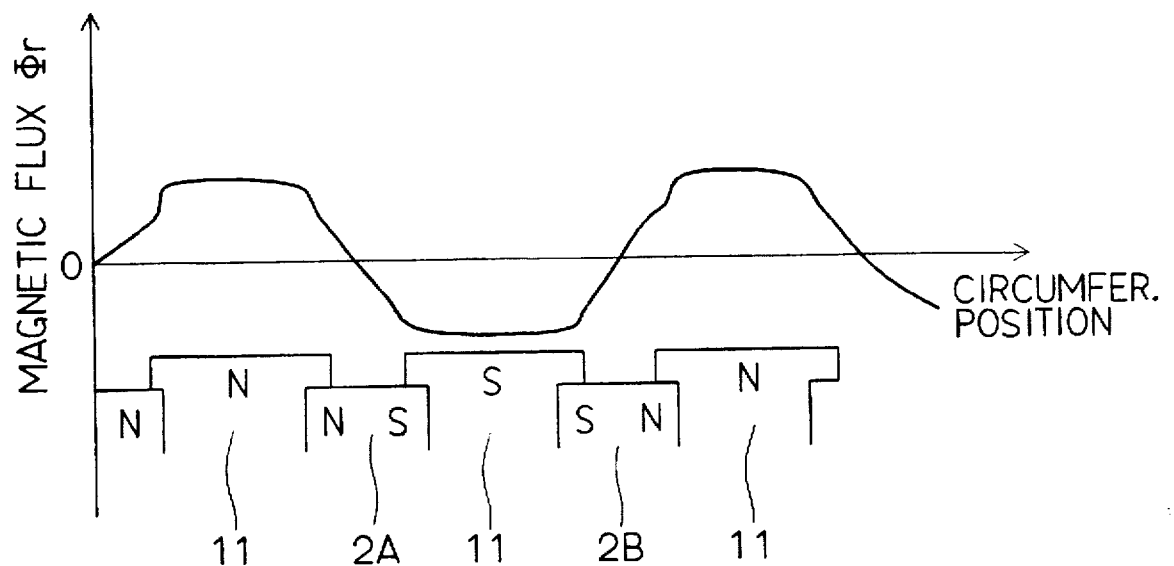
FIG. 5 is a graph illustrating the variation in magnetic flux at the outer periphery of the rotor in the embodiment of the present invention.
Figure 11:
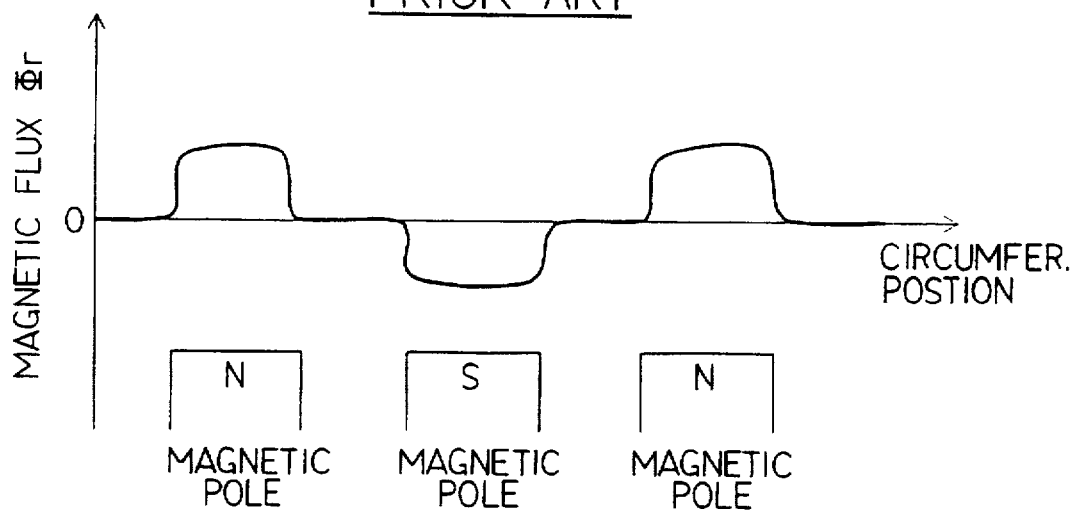
FIG. 11 is a graph illustrating the variation in magnetic flux at the outer periphery of the conventional rotor.

The variation in the magnetic flux quantity Φr crossing the stator coil 41 in this case is illustrated in FIG. 5. FIG. 11 illustrates the variation in the magnetic flux quantity Φr resulting from the rotation of a conventional rotor provided with no permanent magnets 2A and 2B. As shown from the figures, the sharp variations in the magnetic flux quantity Φr (FIG. 11) that are developed in the magnetic pole cores 11 and are alternately different in polarity are inverted by being gently linked with each other by the magnetic fluxes of the permanent magnets 2A and 2B. Thus, the magnetic flux exhibits a state of variation approximate to that of a sine wave (FIG. 5).

Accordingly, the higher harmonic components appearing in the variation in magnetic flux that is shown in the above-mentioned equation (2) become sufficiently small, whereby the frequency f in the above-mentioned equation (1) becomes small. As a result, the iron loss of the stator core decreases with the result that the power generation efficiency increases.

Particularly, in this embodiment, since the flanges 111 are formed with respect to both side edges of the magnetic pole cores 11 so that part thereof may overlap upon the permanent magnets in the radial direction, the continuity of the magnetic flux at the boundaries between the magnetic pole core 11 and the permanent magnets 2A and 2B are improved. Additionally, on the other hand, the permanent magnets 2A and 2B are reliably positioned by the flanges 111.

Also, the permanent magnets 2A and 2B are each located within the resin made retainer body 21 having a heat insulation property. Thus, they are free from the heat generated from the claw shaped magnetic poles 11, with the result that it is possible to prevent high temperature demagnetization due to a rise in the temperature. As a result, it is possible to maintain smooth variations in the magnetic flux at even a high temperature. Also, since a plurality of the permanent magnets 2A and 2B are integrally accommodated within the retainer body 21, assembly thereof into and between the front core 12 and rear core 13 of the rotor 1 is easy. Therefore, time and labor for the storage of the parts are also decreased.

Also, since the claw shaped magnetic poles 11 are each surrounded at their three aspects by the retainer body 21, the temperature thereof is moderately increased due to the heat generated therein, and as a result, the electrical resistance of their surfaces increases, which results in a decrease in the eddy current. As a result of this also, a decrease in the within-alternator loss is realized.

Further, since ferrite is substantially an electrical insulator, the eddy current developed in the permanent magnets is light. As a result of this also, a decrease in the within-alternator loss is furthered.

In FIG. 1, air blast fans 15 and 16 are provided on front and rear faces of the rotor 1. As the rotor 1 rotates, external air is sucked in from air intake ports 611 and 621 plurally provided in the front face of the drive frame 61 and rear face of the rear frame 62 (arrow in the figure). The external air, having been sucked in, cools the rotor coil 14, stator coils 41, voltage regulator 5 as described later, etc., and then is exhausted from exhaust ports 612 and 622 plurally provided in the outer peripheral surfaces of the respective frames 61 and 62.

A slip ring 75 is provided on the outer periphery of a rear end of the shaft 73 projecting from the rear frame 62 for supplying current to the rotor coil 14. A brush 76 is in contact therewith. Also, a covering member 77 is provided in such a manner as to cover the rear end portion of the shaft 73. The voltage regulator 5 that contains a full-wave rectifier 51, as described below, is accommodated inside the covering member 77.

Next, the structure and operation for decreasing the maximum flux density will be explained.

Figure 6:
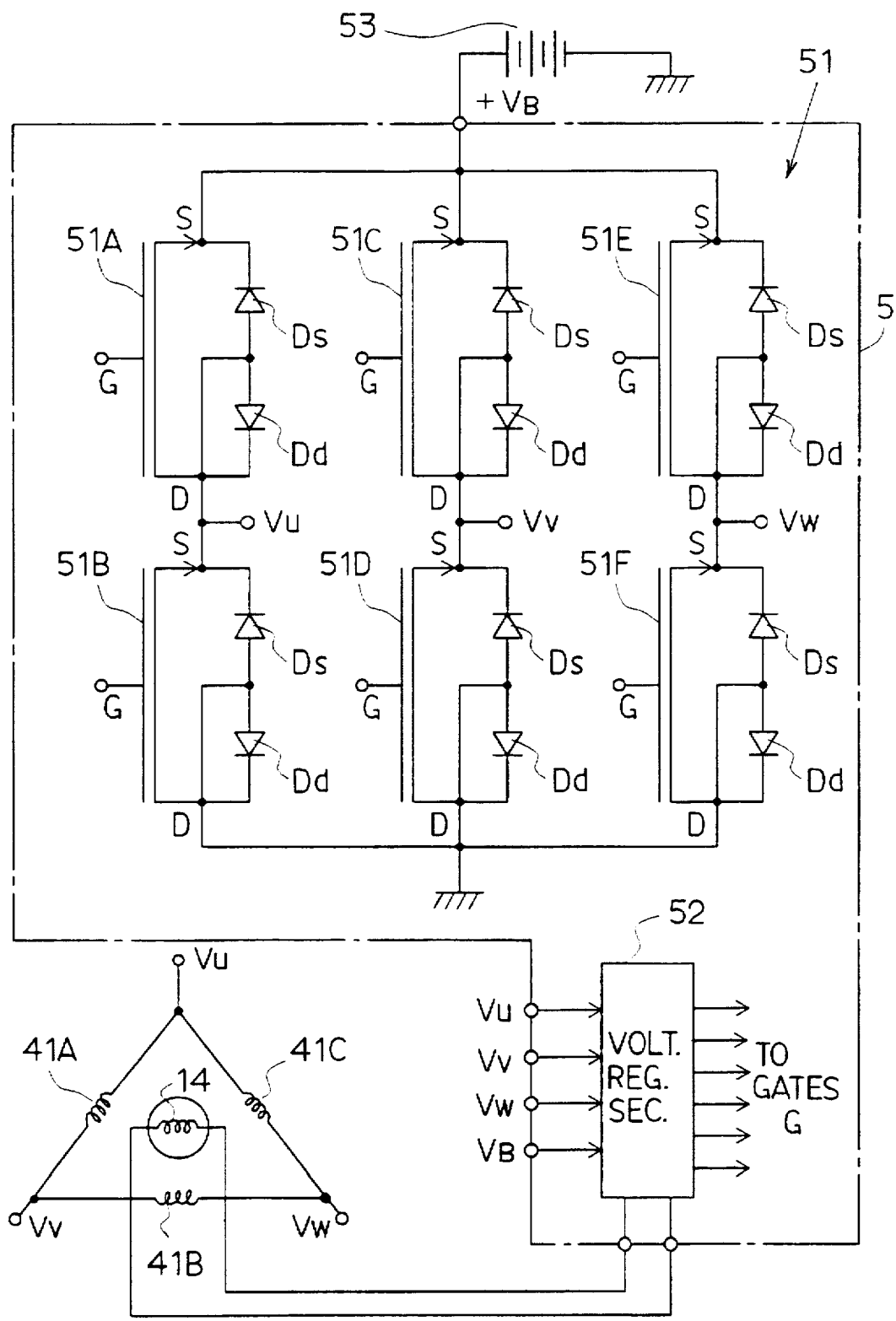
FIG. 6 is an electric circuit diagram of t he alternator according to the embodiment of the present invention.

FIG. 6 illustrates an electric circuit of the alternator that is constructed to charge a battery 53. A voltage regulating section 52 within the voltage regulator 5 reads the voltage of the battery 53 and performs on/off control with respect to excitation of the rotor coil 14 so as to make the voltage of the battery 53 fixed.

As illustrated, the stator coil is actually constructed of Delta-connected three-phase coils 41A, 41B and 41C. The output terminal voltages Vv, Vu and Vw of these coils 41A to 41C are input to respective points of connection between three pairs of MOS type transistors 51A to 51F that constitute the three-phase full-wave rectifier and are also input to the voltage regulating section 52.

That is, in the respective transistors, the drains D of the high side ones 51A, 51C and 51E and the sources S of the low side ones 51B, 51D and 51F are connected to each other. On the other hand, the sources S of the high side ones 51A, 51C and 51E are connected to a high potential side of the battery 53 and the drains D of the low side ones 51B, 51D and 51F are connected to a low potential side of the battery 53. The switching of the transistors 51A to 51F are controlled by signals input to gates G thereof from the voltage regulating section 52.

Figure 7:
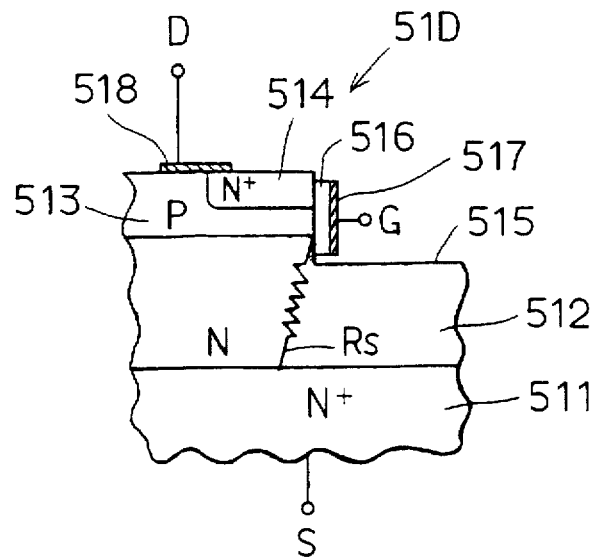
FIG. 7 is a sectional view of a MOS type transistor in the embodiment of the present invention.

The structure of the MOS type transistors 51A to 51F are the same and will be explained hereunder with reference to FIG. 7.

In the figure, an N-type voltage withstanding layer 512 is disposed on an N$^+$type substrate 511 and is made using SiC by homo-epitaxial growth. A P-type well region 513 is formed by ion implantation of aluminum on the surface portion of the N type voltage withstanding layer 512.

Further, an N$^+$type region 514 is formed by ion implantation of nitrogen in the surface portion of the P-type well region 513. By masking the wafer surface by a resist or insulative film with only a trench forming region being opened, a trench 515 is formed with the use of a known dry etching technique such as R.I.E. (reactive ion etching).

Thereafter, a gate insulation film 516 that consists of a silicon oxide film, for example, is formed on the surface of the trench 515 by thermal oxidation, for example. Thereafter, an electrode 517 that consists of doped polysilicon is deposited to be disposed within the trench 515 and to form a gate G. Thereafter, a metal electrode 518 is formed to contact the surfaces of the N$^+$type region 514 and P-type well region 513 to form a drain D. Also a metal electrode (not shown) is formed to contact the N$^+$type substrate 511 and to form a source S.

Between the P-type well region 513 (i.e. the region facing the gate electrode 517) and the sources S or drain D, a parasitic diode Ds (see FIG. 6) on the source-connection side and a parasitic diode Dd on the drain-connection side results. The parasitic diode Dd is shortcircuited and the parasitic diode Ds checks reverse flow from the battery 53.

Next, the operation of switching the respective MOS type transistors 51A to 51F by the voltage regulating section 52 of FIG. 6 will be explained.

The voltage regulating section 52 reads the output terminal voltages Vu, Vv and Vw of the three-phase stator coils 41A to 41C and selects from among the generated line voltages (identical to phase voltages due to the delta connection) Vu-Vv, Vv-Vw and Vw-Vu the one which is positive and higher than the terminal voltage of the battery 53.

Then, one of the high side transistors 51A, 51C and 51E and one of the low side transistors 51B, 51D and 51F are respectively made conductive and operative so that the above selected generated line voltage Vu-Vv, Vv-Vw or Vw-Vu may be applied to the battery 53. As a result, charging current is supplied from the selected three-phase stator coils 41A to 41C to the battery 53.

In this embodiment, as stated previously, since a monocrystalline SiC is used as a base material of each MOS type transistor, the thickness and impurity concentration of the N-type voltage withstanding layer 512 can be greatly improved compared to using SI as the base material of each MOS type transistor.

That is, when Si is used, the breakdown field intensity thereof is approximately 30 V/μm. Assuming, assuming for example, that the withstand voltage of 300 V is undertaken by the N-type voltage withstanding layer 512, the required thickness of the voltage withstanding layer 512 is approximately 20 μm, the impurity concentration thereof is $1 \times 10^{15}$ atoms/cm$^3$ and the resistivity thereof is approximately 5 Ω·cm.

In contrast, the breakdown field intensity of SiC is approximately 400 V/μm or so and therefore the required thickness of the N-type voltage withstanding layer 512 can be made to be approximately 4 μm, the impurity concentration thereof can be made to be $2 \times 10^{16}$ atoms/cm$^3$ and the resistivity thereof can be made to be approximately 1.25 Ω·cm.

Accordingly, the resistance of the N-type voltage withstanding layer 512 of the MOS type transistor (SiC-MOS) made using a SiC material can be decreased to 1/20 of that of the N-type voltage withstanding layer of the MOS type transistor (Si-MOS) made using a Si material.

As a result, the source-side parasitic resistance Rs (see FIG. 7) of the SiC-MOS transistor is decreased to 1/20 that of the Si-MOS transistor. The channel resistance is also decreased greatly in correspondence therewith.

Figure 8:
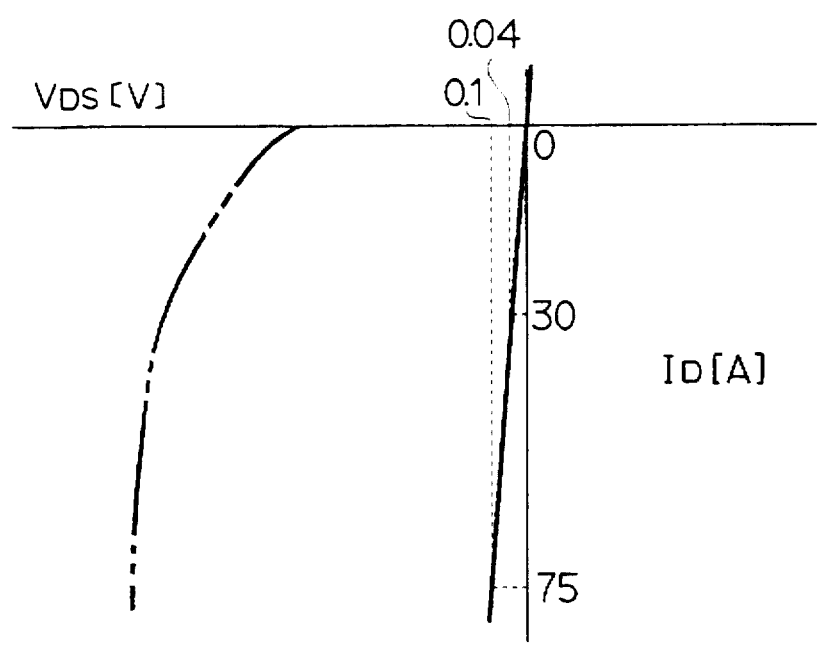
FIG. 8 is a graph illustrating a VDS-ID curve of the MOS type transistor in the embodiment of the present invention.

FIG. 8 illustrates an $I_D$-$V_{DS}$ characteristic of SiC-MOS. It is known that as compared to the forward direction characteristic of the diode as indicated by a two-dot chain line in the figure the voltage drop $V_{DS}$ is small with even an output current $I_D$ of 75 A, whereby the on-resistance is low.

Figure 9:
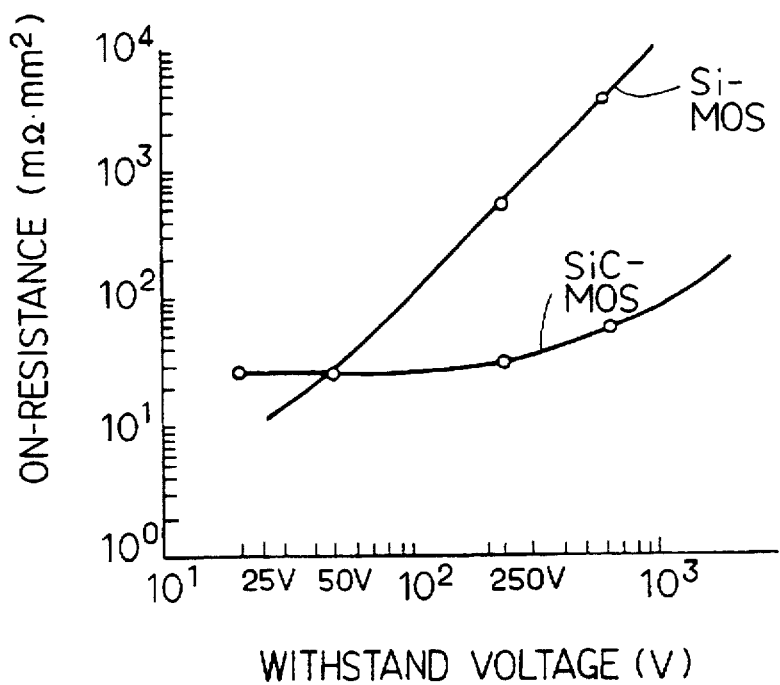
FIG. 9 is a graph illustrating a withstand voltage—on-resistance curve of the MOS type transistor in the embodiment of the present invention.

FIG. 9 illustrates an example of the calculated results of the specific on-resistance that is attained when the required withstand voltage of the MOS transistor has been varied. This specific on-resistance is the sum of the channel resistance and the resistance Rs of the N-type voltage withstanding layer 512. Although the channel resistance fluctuates due to various factors, withstanding layer 512 is predominant in a range of high withstand voltage as will be understood from the figure. Namely, the channel resistance per se exhibits almost no change even when the withstand voltage increases.

Accordingly, when the Si-MOS is used, if the withstand voltage increases from around the withstand voltage of 25 V the on-resistance increases in proportion thereto. When SiC-MOS is used, an increase in the resistance of the N-type voltage withstanding layer 512 can be almost ignored up to withstand voltage of 250 V, and only thereafter, does the on-resistance thereof gently increases.

Figure 10:
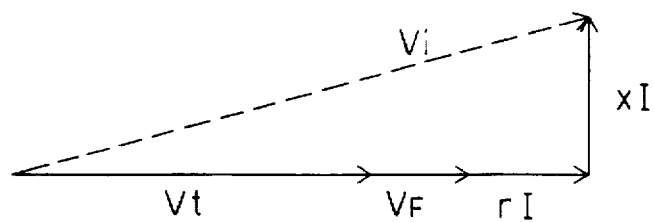
FIG. 10 is a voltage vector diagram in the embodiment of the present invention.

As explained above, for SiC-MOS, the on-resistance thereof can be made sufficiently small even when a large current (75 A or so) is carried therethrough while a sufficient withstand voltage is being ensured with respect to a high voltage applied thereto at a wire breakage time. This makes it possible to lower the generated voltage of the alternator. With reference to the vector diagram of FIG. 10, the generated voltage Vi is made up of the vector sum of the voltage drop $V_F$ of the rectifier elements and the voltage drops rI and xI of the stator due to the impedance that has been calculated with respect to the battery terminal voltage Vt. In this case, r represents the armature resistance, x represents the leakage reactance and I represents the armature current.

Accordingly, if the voltage drop $V_F$ of the rectifier elements becomes small, the generated current voltage Vi can be made low. It is known that this generated voltage Vi is proportional to the previously stated maximum flux density Bm. Accordingly, by making the voltage drop $V_F$ sufficiently small by use of a SiC-MOS having a lower on-resistance, it is possible to markedly lower the generated voltage Vi. Thus, the maximum flux density Bm is also lowered. This results in a small iron loss of the alternator, and hence, an improvement in the generating efficiency.

Also, the heat generated from the rectifying switching means decreases due to low on-resistance of the SiC-MOS transistor. Accordingly, by miniaturizing the cooling fin, it is possible to make the whole rectifying switching means and voltage regulator compact in. Therefore, the area of the intake port 621 of the rear frame 62 (see FIG. 1) is sufficiently ensured and thereby enhancement of the cooling performance is enabled.

Additionally, although the use of SiC-MOS is most effective, the use of even Si-MOS makes the on-resistance thereof low at a time when a large current is carried therethrough as compared to the use of a conventional rectifying diode, with the result that it is possible to expect a sufficient effect.

Also, as the permanent magnet, a resin magnet containing rare earth magnet powder may be used in addition to ferrite magnet.

While the present invention has been shown and described with reference to the foregoing preferred embodiments, it will be apparent to those skilled in the art that changes in form and detail may be made therein without departing from the scope of the invention as defined in the appended claims.

What is claimed is:

1. An alternator comprising:
   a stator having a stator coil;
   a rotor comprising:
      a rotor coil;
      Lundell type magnetic poles which are disposed on an outer periphery of said rotor and along a circumferential direction of said rotor, said Lundell type magnetic poles being polarized by said rotor coil to alternately different polarities;
      permanent magnets disposed between said Lundell type magnetic poles, respectively, so that side faces of each of said permanent magnets in said circumferential direction are polarized to opposite polarities, and said Lundell type magnetic poles and side faces of said permanent magnets which are adjacent to each other have the same polarity to thereby exhibit smooth variations of magnetic flux directed toward said stator coil along said circumferential direction;
      wherein said Lundell type magnetic poles have flanges which project at least circumferentially from side edges thereof and abut on an outer peripheral surface of said permanent magnets, and a magnetic force intensity of each of said side faces of said permanent magnets is substantially equal to a magnetic force intensity developed in each of said Lundell type magnetic poles which is respectively adjacent thereto; and
   a rectifier constructed using a MOS type transistor that converts an alternating current generated by said stator coil to a direct current, wherein said MOS type transistor is formed using as a base material a monocrystalline SiC that is a compound of silicon (Si) and carbon (C) and is smaller in resistivity than Si.

2. An alternator according to claim 1, wherein:
   at least two sets of stator coils are provided to generate a polyphase alternating current;
   at least two pairs of switching circuits which comprise series MOS type transistors, respectively, are connected in parallel with each other between terminals for outputting said direct current; and
   said stator coils are respectively connected to said series MOS type transistors.

3. An alternator according to claim 1, wherein said permanent magnets are integrated within a resin made retainer body having a heat insulation property and said retainer body is disposed between said respective Lundell type magnetic poles.

4. An alternator according to claim 2, wherein said permanent magnets are integrated within a resin made retainer body having a heat insulation property and said retainer body is disposed between said respective Lundell type magnetic poles.

5. An alternator according to claim 3, wherein said retainer body is shaped like a ring that is periodically folded back in such a manner as to extend between said Lundell type magnetic poles that alternately project from a front and a rear side face of said rotor along said circumferential direction; and said permanent magnets are accommodated in respective folded back leg portions of said retainer body.

6. An alternator according to claim 4, wherein said retainer body is shaped like a ring that is periodically folded back in such a manner as to extend between said Lundell type magnetic poles that alternately project from a front and a rear side face of said rotor along said circumferential direction; and said permanent magnets are accommodated in respective folded back leg portions of said retainer body.

7. An alternator according to claim 1, wherein at least one of said permanent magnets is an anisotropic ferrite magnet or a resin magnet containing rare earth magnet powder.

8. An alternator according to claim 2, wherein at least one of said permanent magnets is an anisotropic ferrite magnet or a resin magnet containing rare earth magnet powder.

9. An alternator according to claim 3, wherein at least one of said permanent magnets is an anisotropic ferrite magnet or a resin magnet containing rare earth magnet powder.

10. An alternator according to claim 5, wherein at least one of said permanent magnets is an anisotropic ferrite magnet or a resin magnet containing rare earth magnet powder.

11. An alternator according to claim 1, wherein said stator, said rotor and said rectifier are integrated within a frame body of said alternator.

12. An alternator according to claim 11, further comprising a cooling fin arranged inside of said frame body.

13. A alternator comprising:
   a stator having a stator coil;
   a rotor having permanent magnets and magnetic poles which are disposed on an outer periphery of said rotor and along a circumferential direction of said rotor, said magnetic poles being polarized to alternately different polarities wherein said magnetic poles have flanges which project at least circumferentially from side edges thereof and abut an outer surface of said permanent magnets, and a magnetic force intensity of each of a plurality of side faces of said permanent magnets is substantially equal to a magnetic force intensity developed in each of said magnetic poles which is respectively adjacent thereto;
   a rectifier constructed using a MOS type transistor that converts an alternating current generated by said stator coil to a direct current, wherein said MOS type transistor is formed using as a base material a monocrystalline SiC that is a compound of silicon (Si) and carbon (C) and is smaller in resistivity than Si; and
   a frame body, wherein said stator, said rotor an said rectifier are integrated in said frame body.

14. An alternator according to claim 13, further comprising a cooling fin accommodated arranged inside of said frame body.

15. An alternator according to claim 14, wherein said permanent magnets are disposed between said magnetic poles, respectively, in such a manner that said side faces of said permanent magnets in said circumferential direction are polarized respectively to the same polarities as said adjacent respective magnetic poles to thereby cause the magnetic flux directed toward said stator coil to exhibit smooth variations in polarity along said circumferential direction.

16. An alternator comprising:

a stator having a stator coil;

a rotor comprising:

a rotor coil;

Lundell type magnetic poles which are disposed on an outer periphery of said rotor and along a circumferential direction of said rotor, said magnetic poles being polarized by said rotor coil to alternately different polarities;

permanent magnets disposed between said Lundell type magnetic poles, respectively, so that side faces of each of said permanent magnets in said circumferential direction are polarized to opposite polarities, and said Lundell type magnetic poles and said side faces of said permanent magnets which are adjacent to each other have the same polarity to thereby exhibit smooth variations of magnetic flux directed toward said stator coil along said circumferential direction;

wherein said Lundell type magnetic poles have flanges which project at least circumferentially from side edges thereof and abut on an outer peripheral surface of said permanent magnets; and a rectifier constructed using a MOS type transistor that converts an alternating current generated by said stator coil to a direct current, wherein said MOS type transistor is formed using as a base material a monocrystalline SiC that is a compound of silicon (Si) and carbon (C) and is smaller in resistivity than Si;

wherein said permanent magnets are integrated within a resin made retainer body having a heat insulation property, said retainer body is disposed between said respective Lundell type magnetic poles, and at least one of said permanent magnets is an anisotropic ferrite magnet or a resin magnet containing rare earth magnet powder.

17. An alternator comprising:

a stator having a stator coil;

a rotor comprising:

a rotor coil;

Lundell type magnetic poles which are disposed on an outer periphery of said rotor and along a circumferential direction of said rotor, said magnetic poles being polarized by said rotor coil to alternately different polarities;

permanent magnets disposed between said Lundell type magnetic poles, respectively, so that side faces of each of said permanent magnets in said circumferential direction are polarized to opposite polarities, and said Lundell type magnetic poles and said side faces of said permanent magnets which are adjacent to each other have the same polarity to thereby exhibit smooth variations of magnetic flux directed toward said stator coil along said circumferential direction;

wherein said Lundell type magnetic poles have flanges which project at least circumferentially from side edges thereof and abut on an outer peripheral surface of said permanent magnets; and a rectifier constructed using a MOS type transistor that converts an alternating current generated by said stator coil to a direct current, wherein said MOS type transistor is formed using as a base material a monocrystalline SiC that is a compound of silicon (Si) and carbon (C) and is smaller in resistivity than Si;

wherein said permanent magnets are integrated within a resin made retainer body having a heat insulation property;

said retainer body is disposed between said respective Lundell type magnetic poles, and is shaped like a ring that is periodically folded back in such a manner as to extend between said Lundell type magnetic poles that alternately project from a front and a rear side face of said rotor along said circumferential direction; and said permanent magnets are accommodated in respective folded back leg portions of said retainer body and at least one of said permanent magnets is an anisotropic ferrite magnet or a resin magnet containing rare earth magnet powder.

* * * * *